United States Patent Office 3,784,471
Patented Jan. 8, 1974

3,784,471
SOLID ADDITIVES DISPERSED IN PERFLUORINATED LIQUIDS WITH PERFLUOROALKYL ETHER DISPERSANTS
Robert Kaiser, Cambridge, Mass., assignor to Avco Corporation, Cincinnati, Ohio
No Drawing. Filed May 11, 1970, Ser. No. 36,429
Int. Cl. C10m *3/02, 3/06, 3/24*
U.S. Cl. 252—21                     11 Claims

ABSTRACT OF THE DISCLOSURE

Stable dispersions of a wide variety of solids, e.g. magnetite, silica, carbon black, graphite, and the like, are provided in perfluorinated liquids. The colloids provided by the present invention can be utilized in the same fashion as hydrocarbon based colloidal dispersions, and additionally, because of the particular characteristics of the carrier medium, have the additional advantages of immiscibility with both hydrocarbon and aqueous media. Thus, the ferrofluids formed by dispersing magnetic particles in accordance with the present invention are particularly useful as seal fluids. They can be positioned in space by a magnetic field. The stable dispersions are formed by dispersing finely divided solids of up to about one micron in the presence of a perfluorinated liquid, such as Freon E or Krytox oil and a surfactant having the following:

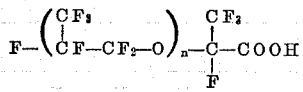

where $n$ is an integer of from 3 to 50.

---

This invention relates to colloidal dispersions immiscible with both hydrocarbon and aqueous media. More particularly, it relates to stable colloidal dispersions of particulate solids in inert fluorocarbon, which are nonvolatile, and immiscible with hydrocarbon and aqueous media.

The desirability of stable colloidal dispersions of particulate solids in an inert, nonvolatile, water and hydrocarbon immiscible carrier liquid is almost self-evident. Perfluorinated liquids are water and hydrocarbon immiscible. For most practical purposes they are sufficiently inert and non-volatile. Moreover, a wide variety of fluorocarbons are commercially available.

Of particular interest to formation of stable colloidal dispersions are the perfluorinated fluorocarbons prepared by the anionic polymerization of hexafluoropropylene oxide. Perfluoro polyethers of any desired chain length can be obtained. These polyethers have a reactive end group which may be end capped as desired. From the hexafluoropropylene oxide condensates are prepared a wide variety of liquid perfluorinated ethers which have the following general formula:

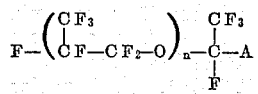

The lower molecular weight analogs $n \leq 9$ which are hydrogen end-capped ($A=H$) are commercially available under the trade name "Freon-E." The high molecular weight compounds $n > 9$ which are completely fluorinated ($A=F$) are available as "Krytox" oils. The Freon E fluids and the Krytox oils have characteristics desirable as the carrier liquid in the preparation of the colloids of the present invention. These hexafluoropropylene oxide condensates where $n$ is from 1–50 are preferred carriers. While the foregoing materials are preferred because of their availability and convenience, it should be understood that practice of the present invention contemplates the entire class of perfluorinated liquids.

The "Freon E" and "Krytox" materials alluded to above are polyethers. Other exemplary carrier liquids which have tested out satisfactorily are: perfluorinated kerosene (essentially aliphatic in nature), perfluorinated benzene (aromatic), perfluorinated tributyl amine and even perfluorinated materials of unknown composition such as FC–75, a product sold by Minnesota Mining and Manufacturing Company.

Within the context of the present invention, the perfluorinated liquids are organic compounds (as opposed to inorganic compounds) wherein at least 90% of the hydrogen content (associated with the precursor compound) has been replaced by fluorine. Thus, for example, the hexafluoropropylene oxide condensates described above are perfluorinated liquids regardless of whether they are fluorine end-capped as in the "Krytox" oils or hydrogen end-capped as in the "Freon E" series.

Characteristically, the perfluorinated liquids are stable materials immiscible with water, hydrocarbons and virtually all solvents. These properties offer possibilities for substantial and wide-spread commercial uses, particularly if the perfluorinated liquids can be thickened, e.g. with silica or alumina (to form greases), pigmented, e.g. by carbon black (to form specialty inks), etc. In short, a need exists for a way to form stable dispersions of finely divided solid particles (micron or less, in perfluorinated liquids). However, stable dispersion is perfluorinated liquids have not been achieved by conventional dispersing agents.

It has now been found that stable colloidal dispersions in perfluorinated liquids can be formed by utilizing a fluorocarbon surfactant having the following formula:

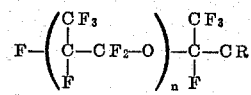

where $n$ is an integer from 3 to 50 preferably 5 to 25; and where R is OOH, OH, OONH$_4$, ONH$_2$, NH$_2$, with OOH being preferred.

The stable dispersions of the present invention can be prepared readily. A simple and highly effective technique is to wet grind finely-divided solids in a ball mill in the presence of the surfactant compound dissolved in the carrier liquid, e.g. "Freon" E–3 or the like.

The relative proportions of the surfactant to the suspended solids are not narrowly significant to the preparation of stable colloids. The proportions can be varied widely so long as there is a sufficient concentration of the surfactant component to provide at least a monomolecular covering of the particles in suspension. The numerical limits in proportions are so broad and dependent on other factors (particle size, density, etc.) as to be almost meaningless, the proportions being, for example, as low as 0.001 parts by weight of surfactant per part of particles for a large, e.g. (1 micron (10,000 A.) low density material to as much as 100 parts by weight per part of very small, e.g. 100 A. particles of a high density material (such as magnetite). A realistic range for forming stable suspensions is 0.01–5.0 parts by weight per part of solids.

The particulate solids encompassed by the present invention include those materials which will interact, either physically or chemically, with the carboxylic acid group or other active end group of the surfactant molecule to form an attachment or attraction. The surface interactions of particulate solids include phenomena well-known in the art, and it is within the skill of the art to increase or decrease, eliminate the conditions which provide such interactions. The particle sizes contemplated for formation of stable dispersions according to practice of this invention are small, i.e. not more than about 1 micron, and in many instances much smaller than 1 micron. Desirably permanently stable dispersions are obtained. More generally dispersions which last little more than 24 hours, prior to agglomeration or gellation are useful in many instances and are, therefore, contemplated as being stable dispersions or suspensions as herein contemplated.

The solids capable of suspension are legion, with inorganic materials being of greatest interest. Certain of the inorganic materials are, however, particularly noteworthy because perfluorinated liquid dispersions thereof are highly advantageous. Thus, materials with high electromagnetic susceptability are in that sense preferred materials, including magnetite, gamma iron oxide, the various ferrites, and barium titanate all in very small particle sizes, 500 A. or less. Dispersions with carbon black may be employed as specialty inks or simply as carbon black extended liquids. Dispersions with graphite or molybdenum disulfide may be employed as lubricants. The perfluorinated liquids thickened with finely divided silica or alumina may be used as greases.

The stable colloidal dispersions of the present invention find unique applications, mostly by virtue of the particular characteristics of the carrier liquid. The fluorocarbon liquid carriers as a class, are generally immiscible with most other liquids normally encountered. In particular, they are immiscible with both aqueous and hydrocarbon based systems. Thus, the fluorocarbon based colloidal dispersions can be used in contact with a wide variety of liquids without dissolution of one or more components into the other media. The stable dispersions of magnetic solids, such as magnetite, particularly in the higher molecular weight carrier liquids, are especially useful as shaft seal fluids. The magnetic susceptibility of the particles is imparted to the entire suspension permitting the colloid to be maintained in position in space by a magnetic field. This in conjunction with the inertness and immiscibility of the fluorocarbon liquid will lead those skilled in the art to a number of particular utilizations.

The following examples are presented to illustrative detailed practice of the invention.

EXAMPLE I

A series of colloidal dispersions of magnetite in an inert fluorinated ether carrier were prepared utilizing four different hexafluoropropylene oxide polymer acid surfactants. The carried liquid utilized was "Freon" E-3 (DuPont) having the following formula:

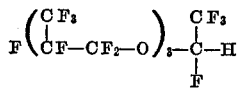

while the four surfactants utilized had the following general formula:

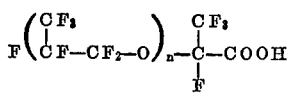

Surfactant A had a molecular weight of about 1,000, $n$ equal to 5; surfactant B had a molecular weight of 1660, $n$ equal to 9; surfactant C had a molecular weight of 2600, $n$ equal to 15; surfactant D had a molecular weight of 4200, $n$ equal to 24. The magnetite powder utilized was IRN-100 (Charles Pfizer and Co., Inc.). The dispersions were prepared by wet grinding the finely-divided magnetite powder in the presence of surfactant and the inert fluorocarbon carrier using a ball mill half filled with steel balls. The relative proportions of the ingredients used in formulating the dispersions were: Magnetite—1 volume, surfactant—2.5 volumes (4.5 gm.), inert carrier—30 volumes (50 gm.). The ball milling was effective in forming the colloidal dispersion over a milling period of about 1 hour. In each of the four preparations, an effective and permanently stable colloidal dispersion was formed.

In a further investigation of the stability of the four colloidal dispersions, a single drop of each colloid was added to a large excess of test liquid and the compatibility of the colloidal dispersion with the various fluorocarbon media was noted. The fluorocarbon liquids to which the colloidal dispersion was added were Freon E-3, Freon E-5, Freon E-9, Krytox AZ, Krytox AB, and Krytox AC. These materials have the following formulas:

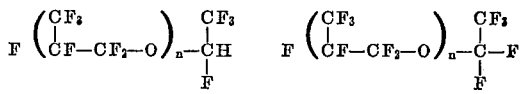

"Freon E"           "Krytox"

Freon E-3 has a molecular weight of 620, $n$ equal to 3; Freon E-5 has a molecular weight of 950, $n$ equal to 5; Freon E-9 has a molecular weight of 1500, $n$ equal to 9. The Krytox oils AZ, AA, AB and AC have molecular weights, respectively, of 1900, 2500, 3600 and 5000. $n$ in the above formula for the Krytox oils is, respectively, 18, 24, 35, and 49. The results of the tests are summarized in the table, where a (+) indicates that the drop of the colloidal dispersion dispersed readily when added to the indicated liquid, while a (−) indicates that spontaneous flocculation and separation of a solid phase occurred.

TABLE

| Molecular weight | Carrier liquid | | | | | | |
|---|---|---|---|---|---|---|---|
| | Freon | | | Krytox | | | |
| | E-3 620 | E-5 950 | E-9 1,500 | AZ 1,900 | AA 2,500 | AB 3,600 | AC 5,000 |
| A | + | + | − | − | − | − | − |
| B | + | + | + | + | − | − | − |
| C | + | + | + | + | + | + | − |
| D | + | + | + | + | + | + | + |

The table indicates that the colloidal systems are less stable when the molecular weight of the carrier liquid exceeds the molecular weight of the surfactant by more than about 50%, particularly for the lower molecular weigh surfactants. It was observed, however, that, in the cases where flocculation occurred, the addition of either a low molecular weight perfluorinated carrier liquid, such as Freon A-3, or the addition of a higher molecular weight surfactant to the system produced a spontaneous redispersion of the solid phase material.

The colloidal dispersions of magnetite were immiscible with both oil and water based fluids in general, retaining the immiscibility characteristics of the carrier liquid. They are miscible with other perfluorinated liquids, such as for example, perfluorotributyl amine. They are incompatible with solvents which differ markedly in chemical structure from that of the carrier, including, for example, such as perchlorinated solvents, or partially fluorinated hydrocarbon liquids.

EXAMPLE II

A colloidal stable dispersion of silica was prepared by tumbling in a ball mill for 72 hours a mixture of 300 cc. "Freon" E-3 (DuPont) 10 gms. finely divided $SiO_2$ (QUSO F 20, Philadelphia Quantity) and 40 gms. of surfactant C (M.W. 2600). The dispersion had a density of 1,735 gm./cc. and a viscosity of 3.6 cp. (at 30°).

Centrifuging at 6000 g. for 15 minutes caused very little separation.

Efforts to form a stable suspension by tumbling the same materials, without surfactant failed.

EXAMPLE III

In a series of runs the following ingredients were employed: Sulfur powder, carbon black (Raven 30 Columbian Carbon), surfactant C and a perfluorinated liquid of unknown composition (FC-75 Minnesota Mining and Manufacturing Co.) The ingredients were added to a jar with glass balls and mixed on a high speed shaker.

The individual runs are set out in the following table:

| Sample number | 1 | 2 | 3 | 4 |
|---|---|---|---|---|
| Powder | C black | C black | Sulfur | Sulfur |
| Weight, gms | 2 | 2 | 2.2 | 2 |
| FC-75, gms | 36 | 40 | 36 | 40 |
| Surfactant C, gms | 4 | | 4 | |

Samples 1 and 3 dispersed satisfactorily; samples 2, 4 did not. Sample 2 had thickened.

After 24 hours samples 1 and 2 were centrifuged. No separation occurred in sample 1; complete separation occurred with sample 2.

The jar containing sample 3 was broken so 3 gms. of surfactant was added to sample 4, shaken for 4 hours, then observed after 24 hours. The dispersion had not settled.

EXAMPLE IV

Using the procedure and proportions set out in Example 1 magnetite dispersions with surfactant B were made in the following perfluorinated liquids:

(a) perfluorodimethyl cyclobutane isomers (Freon C-51-12 DuPont)
(b) perfluorotributyl amine (FC-43—Minnesota Mining & Manufacturing Co.)
(c) perfluoro alkanes 70, 115, 195, 225 (Pierce Chemical Co.)
(d) hexafluorobenzene and perfluoroxylene (Pierce Chemical Co.)
(e) perfluorinated decalin (Pierce Chemical Co. Fluid No. 5) and perfluorinated methyl cyclohexane (Pierce Chemical Co. Fluid No. 3)
(f) perfluoro-2-butyltetrahydrofuran (Pierce Chemical Co.).

What is claimed is:

1. A stable dispersion of particulate solids not exceeding about one micron in size in a perfluorinated carrier liquid and a surfactant, said surfactant having the following formula

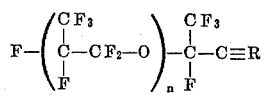

wherein $n$ is an integer of from 3 to 50, and wherein R is a member selected from the group consisting of

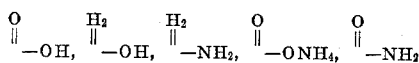

2. A dispersion as in claim 1 wherein $n$ is an integer from 5 to 25 and R is OOH and wherein said surfactant is present in an amount from about 0.001 to about 100 parts per part of particulate solid.

3. A dispersion as in claim 1 wherein the particulate solids are materials of high electromagnetic susceptibility and have a particle size of less than about 500 A.

4. A dispersion as in claim 3 wherein the particulate solids are magnetite.

5. A dispersion as in claim 1 wherein the particulate solids are silica.

6. A stable dispersion of particulate solids not exceeding about one micron in size in a perfluorinated carrier liquid and a surfactant, said surfactant having the following formula

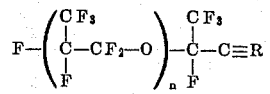

wherein $n$ is an integer of from 3 to 50, and wherein R is a member selected from the group consisting of

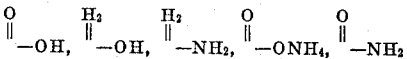

and said perfluorinated liquid having the following formula

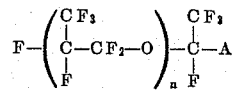

wherein $n$ is an integer of from 1 to 50, and wherein A is selected from the group consisting of H, F and wherein said surfactant is present in an amount of from about 0.01 to about 5.0 parts per part of particulate solid.

7. A dispersion as in claim 6 wherein the particulate solids are materials of high electromagnetic susceptibility and have a particle size of less than about 500 A.

8. A dispersion as in claim 6 wherein the particulate solids are magnetite.

9. A dispersion as in claim 6 wherein the particulate solids are silica.

10. A dispersion as in claim 1 where the molecular weight of said surfactant is at least about 50% of the molecular weight of the perfluorinated liquid.

11. A dispersion as in claim 6 where the molecular weight of said surfactant is at least 50% of the molecular weight of the perfluorinated liquid.

References Cited

UNITED STATES PATENTS

| | | | |
|---|---|---|---|
| 3,010,896 | 11/1961 | Odell et al. | 252—18 |
| 3,424,678 | 1/1969 | Morway et al. | 252—18 |
| 2,676,925 | 4/1954 | Lindstrom et al. | 252—25 |
| 2,751,352 | 6/1956 | Bondi | 252—25 |
| 3,214,478 | 10/1965 | Milian | 252—54 |
| 3,242,218 | 3/1966 | Miller | 252—54 |
| 3,250,808 | 5/1966 | Moore et al. | 252—33.6 |
| 3,306,854 | 2/1967 | Gumprecht | 252—389 |
| 3,384,581 | 5/1968 | Peace | 252—25 |
| 3,399,145 | 8/1968 | Martinek et al. | 252—25 |
| 3,432,432 | 3/1969 | Dreher | 252—25 |
| 3,464,854 | 9/1969 | Bolger | 252—25 |
| 3,597,359 | 8/1971 | Smith | 252—389 |
| 3,274,239 | 9/1966 | Gelman | 260—535 |
| 3,367,868 | 2/1968 | Skehan | 252—54 |

PATRICK P. GARVIN, Primary Examiner

I. VAUGHN, Assistant Examiner

U.S. Cl. X.R.

252—18, 25, 28, 33.6, 51.5 R, 51.5 A, 54, 54.6, 58, 62.56

UNITED STATES PATENT OFFICE
CERTIFICATE OF CORRECTION

Patent No. 3,784,471         Dated January 8, 1974

Inventor(s) Robert Kaiser

It is certified that error appears in the above-identified patent and that said Letters Patent are hereby corrected as shown below:

Column 3, line 44, for "illustrative", please read -- illustrate --.

Column 4, line 45, for "weigh", please read -- weight --.

Column 4, line 48, for "Freon A-3", please read -- Freon E-3 --.

Column 5, after line 54, Claim 1, please insert -- and wherein said surfactant is present in an amount from about 0.001 to about 100 parts per part of particulate solid --.

Column 5, line 56, Claim 2, please delete -- and wherein said surfactant is present in an amount from about 0.001 to about 100 parts per part of particulate solid.

Signed and sealed this 3rd day of December 1974.

(SEAL)
Attest:

McCOY M. GIBSON JR.
Attesting Officer

C. MARSHALL DANN
Commissioner of Patents